(12) United States Patent
Wan et al.

(10) Patent No.: US 12,199,429 B2
(45) Date of Patent: Jan. 14, 2025

(54) CHANCE CONSTRAINED EXTREME LEARNING MACHINE METHOD FOR NONPARAMETRIC INTERVAL FORECASTING OF WIND POWER

(71) Applicant: ZHEJIANG UNIVERSITY, Zhejiang (CN)

(72) Inventors: Can Wan, Hangzhou (CN); Changfei Zhao, Hangzhou (CN); Yonghua Song, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 400 days.

(21) Appl. No.: 17/694,689

(22) Filed: Mar. 15, 2022

(65) Prior Publication Data

US 2022/0209532 A1    Jun. 30, 2022

Related U.S. Application Data

(63) Continuation of application No. PCT/CN2021/080895, filed on Mar. 16, 2021.

(30) Foreign Application Priority Data

Apr. 2, 2020   (CN) .......................... 202010255104.2

(51) Int. Cl.
  *H02J 3/00*  (2006.01)
  *G05B 19/042*  (2006.01)
  *H02J 3/38*  (2006.01)

(52) U.S. Cl.
  CPC ............ *H02J 3/004* (2020.01); *G05B 19/042* (2013.01); *H02J 3/003* (2020.01); *H02J 3/381* (2013.01);
  (Continued)

(58) Field of Classification Search
  CPC .. H02J 3/004; H02J 3/003; H02J 3/381; H02J 2203/20; H02J 2300/28; G05B 19/042;
  (Continued)

(56) References Cited

U.S. PATENT DOCUMENTS

| 10,678,196 | B1* | 6/2020 | Al-Turki | .............. | G05B 13/041 |
| 2004/0068332 | A1* | 4/2004 | Ben-Gal | .......... | G06F 18/24323 |
| | | | | | 700/51 |

FOREIGN PATENT DOCUMENTS

| CN | 105006843 A | 10/2015 |
| CN | 105046374 A | 11/2015 |

(Continued)

OTHER PUBLICATIONS

Wang, H.Z., Li, G.Q., Wang, G.B., Peng, J.C., Jiang, H. and Liu, Y.T., 2017. Deep learning based ensemble approach for probabilistic wind power forecasting. Applied energy, 188, pp. 56-70. (Year: 2017).*

(Continued)

*Primary Examiner* — Alicia M. Choi
(74) *Attorney, Agent, or Firm* — W&G Law Group

(57) ABSTRACT

The present application discloses a chance constrained extreme learning machine method for nonparametric interval forecasting of wind power, which belongs to the field of renewable energy generation forecasting. The method combines an extreme learning machine with a chance constrained optimization model, ensures that the interval coverage probability is no less than the confidence level by chance constraint, and takes minimizing the interval width as the training objective. The method avoids relying on the probability distribution hypothesis or limiting the interval boundary quantile level, so as to directly construct prediction intervals with well reliability and sharpness. The present application also proposes a bisection search algorithm based on difference of convex functions optimization to achieve (Continued)

efficient training for the chance constrained extreme learning machine.

2 Claims, 2 Drawing Sheets

(52) U.S. Cl.
CPC ............... *G05B 2219/2619* (2013.01); *G05B 2219/2639* (2013.01); *H02J 2203/20* (2020.01); *H02J 2300/28* (2020.01)

(58) Field of Classification Search
CPC .... G05B 2219/2619; G05B 2219/2639; G05B 15/02; G05B 13/0265; F05B 2260/821; F05B 2270/335; F03D 17/00; Y02E 10/76; G06Q 10/04; G06F 17/11
See application file for complete search history.

(56) References Cited

FOREIGN PATENT DOCUMENTS

| | | |
|---|---|---|
| CN | 108428017 A | 8/2018 |
| CN | 110348606 A | 10/2019 |
| CN | 110428084 A | 11/2019 |
| CN | 111541237 A | 8/2020 |
| IN | 105203869 A | 12/2015 |
| JP | 2002354837 A | 12/2002 |
| WO | 2015118055 A1 | 8/2015 |

OTHER PUBLICATIONS

Hempel, A.B., Goulart, P. J. and Lygeros, J., 2014. Inverse parametric optimization with an application to hybrid system control. IEEE Transactions on automatic control, 60(4), pp. 1064-1069. (Year: 2014).*

Jiang, H. and Li, X., 2010. Parameter estimation of statistical models using convex optimization. IEEE Signal Processing Magazine, 27(3), pp. 115-127. (Year: 2010).*

Chunlin, D. and Liu, Y., 2012. Sample average approximation method for chance constrained stochastic programming in transportation model of emergency management. Systems Engineering Procedia, 5, pp. 137-143. (Year: 2012).*

Safari, N., Mazhari, S.M. and Chung, C.Y., 2018. Very short-term wind power prediction interval framework via bi-level optimization and novel convex cost function. IEEE Transactions on Power Systems, 34(2), pp. 1289-1300. (Year: 2018).*

International Search Report (PCT/CN2021/080895); Date of Mailing: Jun. 23, 2021.

CN First Office Action(202010255104.2); Date of Mailing: Jun. 3, 2021.

An Adaptive Bilevel Programming Model for Nonparametric Prediction Intervals of Wind Power Generation; Date of Mailing: Jan. 31, 2020.

An Advanced Approach for Construction of Optimal Wind Power Prediction Intervals; Date of Mailing: Sep. 30, 2015.

Prediction Intervals Forecasts of Wind Power based on PSO-KELM; Date of Mailing: Sep. 30, 2015.

Short term wind power forecasting using Chebyshev polynominal trained ridge extreme learning machine; Date of Mailing: Mar. 24, 2016.

Study on Prediction Interval Estimation and Generation Scheduling Method for Power System with Large-scale Wind Power Integration; Date of Mailing: Jul. 15, 2016.

Optimal Active Power Flow Considering Uncertainties of Wind Power Output and Load; Date of Mailing: Jan. 5, 2013.

* cited by examiner

CHANCE CONSTRAINED EXTREME LEARNING MACHINE METHOD FOR NONPARAMETRIC INTERVAL FORECASTING OF WIND POWER

CROSS-REFERENCE TO RELATED APPLICATIONS

The present application is a continuation of International Application No. PCT/CN2021/080895, filed on Mar. 16, 2021, which claims priority to Chinese Application No. 202010255104.2, filed on Apr. 2, 2020, the contents of both of which are incorporated herein by reference in their entireties.

TECHNICAL FIELD

The present application relates to a chance constrained extreme learning machine method for nonparametric interval forecasting of wind power, and belongs to the field of renewable energy power generation prediction.

BACKGROUND

At present, wind energy has become one of the main sources of renewable energy power generation due to its advantages such as wide distribution of resources, mature development technology and low investment cost. However, the chaotic nature of the atmospheric system leads to significant intermittency and uncertainty in wind power, posing a great challenge to the secure operation of the power system with a large share of wind power integration. High-precision wind power prediction provides key information support for power system planning and construction, operational control, market transactions, etc., and is one of the important means to help power system effectively cope with wind power uncertainty.

Traditional wind power prediction focuses on deterministic point prediction with a single point expected value as an output, so it is difficult to avoid prediction errors. Probabilistic forecasting effectively quantifies the uncertainty of wind power prediction by prediction interval, predictive quantile and predictive probability distribution, and provides more abundant and comprehensive information for decision makers, and thus has become research frontier in the field of wind power prediction. The prediction interval contains the future wind power with a certain confidence level, with clear probability interpretation and concise mathematical form, and thus is widely used in economic dispatch, optimal power flow, risk assessment and stability analysis of the power system. However, the existing methods need to prescribe the quantile proportions corresponding to the interval bounds in advance when deriving the wind power prediction interval. The common practice is to limit the interval bounds to be symmetrical about the median of the wind power to be predicted in the sense of probability. The limitation of asymmetric wind power probability distribution will lead to a conservative interval width and increase the potential operation cost for the power system to cope with the uncertainty of wind power. Therefore, it is necessary to invent a wind power interval prediction method with better flexibility, which can adaptively determine the quantile proportions of the interval bounds, and minimize the prediction interval width on the premise of meeting the nominal confidence level.

SUMMARY

In view of the limitations of existing wind power interval prediction methods, the present application provides a wind power nonparametric interval prediction method based on a chance constrained extreme learning machine. This method does not depend on the parametric hypothesis of wind power probability distribution, does not need to specify the quantile proportions corresponding to the interval bounds in advance, but directly generates the wind power prediction interval meeting the confidence level with the goal of minimizing the interval width, and thus can adapt to symmetric or asymmetric wind power probability distribution under time-varying conditions. It is also suitable for interval prediction of other renewable energy generation power and load, and has good flexibility and adaptability In order to achieve the above purpose, the present application adopts the following technical solution:

A wind power nonparametric interval prediction method based on a chance constrained extreme learning machine, comprising the following steps of:

(1) constructing a chance constrained extreme learning machine model using the extreme learning machine as a regression function of upper and lower bounds of the wind power prediction interval, comprehensively considering joint probability distribution of a wind power and an input feature thereof, limiting the wind power to fall into the prediction intervals with a probability not lower than a nominal confidence level by using chance constraint, and taking an expectation of minimizing an interval width as a training objective, and constructing the chance constrained extreme learning machine model:

$$\min_{\omega_f, \omega_u} \mathbb{E}_\mu [f(x, \omega_u) - f(x, \omega_f)]$$

which is subject to:

$$\mathbb{P}_\mu[f(x, \omega_f) \le y \le f(x, \omega_u)] \ge 100(1 - \beta) \%$$

$$0 \le f(x, \omega_f) \le f(x, \omega_u) \le 1$$

where x is a random variable corresponding to the input feature, y is a random variable corresponding to normalized wind power, a joint probability distribution of the two is denoted as μ(x,y); f(x, $\omega_l$) and f(x, $\omega_u$) are output equations of the extreme learning machine, which represent lower and upper boundaries of the prediction interval, respectively, $\omega_l$ and $\omega_u$ are weight vectors from a hidden layer of the extreme learning machine to output neurons; 100(1−β)% is the nominal confidence level of the prediction interval; $\mathbb{E}$ and $\mathbb{P}$ denote expectation and probability operators respectively;

(2) constructing a sample average approximate model of the chance constrained extreme learning machine replacing the joint probability distribution of the input feature and wind power with an empirical probability distribution of training set samples thereof, approximating an actual expectation in an objective function by empirical expectation, and approximating an actual probability in the chance constraint by empirical probability to obtain the sample average approximate model of the chance constrained extreme learning machine;

$$v^* = \min_{y_t, \omega_f, \omega_u} \Sigma_{t \in \mathcal{T}} [f(x_t, \omega_u) - f(x_t, \omega_f)]$$

which is subject to:

$$\gamma_t = \max\{f(x_t, \omega_\ell) - y_t, y_t - f(x_t, \omega_u)\}, \forall t \in \mathcal{T}$$

$$\Sigma_{t \in \mathcal{T}}[1 - \mathbb{1}(\gamma_t \leq 0)] \leq \beta|\mathcal{T}|$$

$$0 \leq f(x_t, \omega_\ell) \leq f(x_t, \omega_u) \leq 1, \forall t \in \mathcal{T}$$

where v* is an optimal value of the optimization model, which donates the shortest overall width of prediction intervals satisfying the chance constraint; $x_t$ and $y_t$ are an input feature and the wind power; $\mathcal{T}$ is a subscript set of various samples of the training set $\{(x_t, y_t)\}_{t \in \mathcal{T}}$, $|\mathcal{T}|$ is a number of the samples of the training set, $\beta|\mathcal{T}|$ is a maximum number of wind power samples outside the prediction interval at the nominal confidence level; $\gamma_t$ is an auxiliary variable indicating whether the wind power falls into the prediction interval, with a non-negative value indicating that the wind power falls into the corresponding prediction interval, or a positive value indicating that the wind power does not fall into the corresponding prediction interval; max{•} is a maximum function, taking a maximum value of each variable thereof; $\mathbb{1}$(•) is an indicator function of a logical discriminant, with a value being 1 when the logical discriminant is true and 0 when the logical discriminant is false;

(3) constructing a parametric 0-1 loss minimization model;

introducing a virtual parametric variable to represent an overall width budget of the prediction interval, minimizing the probability that the wind power does not fall into the prediction interval on a premise of meeting the width budget to obtain the parametric 0-1 loss minimization model:

$$\rho(v) = \min_{\gamma_t, \omega_\ell, \omega_u} \Sigma_{t \in \mathcal{T}}[1 - \mathbb{1}(\gamma_t \leq 0)]$$

which is subject to:

$$\gamma_t \geq f(x_t, \omega_\ell) - y_t, \forall t \in \mathcal{T}$$

$$\gamma_t \geq y_t - f(x_t, \omega_u), \forall t \in \mathcal{T}$$

$$\sum_{t \in \mathcal{T}}[f(x_t, \omega_u) - f(x_t, \omega_\ell)] \leq v$$

$$0 \leq f(x_t, \omega_\ell) \leq f(x_t, \omega_u) \leq 1, \forall t \in \mathcal{T}$$

where v is an introduced parameter representing the overall width budget of the prediction interval; $\rho(v)$ is an optimal value function of the parametric 0-1 loss minimization model with the parameter v, and the smallest parameter that satisfies the condition $\rho(v) \leq \beta|\mathcal{T}|$ is the shortest overall width v* of the prediction intervals that satisfy the chance constraint;

(4) constructing a parametric difference of convex functions optimization model approximating the indicator function in the objective function of the parametric 0-1 loss minimization model by a difference of convex function to obtain the parametric difference of convex functions optimization model:

$$\bar{\rho}(v) = \min_{\gamma_t, \omega_\ell, \omega_u} \sum_{k \in \mathcal{T}}[1 - L_{DC}(\gamma_t; m)]$$

which is subject to:

$$L_{DC}(\gamma_t; m) = \max\{-m\gamma_t, 0\} - \max\{-m\gamma_t - 1, 0\}, \forall t \in \mathcal{T}$$

$$\gamma_t \geq f(x_t, \omega_\ell) - y_t, \forall t \in \mathcal{T}$$

$$\gamma_t \geq y_t - f(x_t, \omega_u), \forall t \in \mathcal{T}$$

$$\Sigma_{t \in \mathcal{T}}[f(x_t, \omega_u) - f(x_t, \omega_\ell)] \leq v$$

$$0 \leq f(x_t, \omega_\ell) \leq f(x_t, \omega_u) \leq 1, \forall t \in \mathcal{T}$$

where $\bar{\rho}(v)$ is the optimal value function of the parametric difference of convex functions optimization model with the parameter v; $L_{DC}(\gamma_t; m)$ is a difference of convex functions approximating the indicator function $\mathbb{1}(\gamma_t \leq 0)$; m is a positive slope parameter of the difference of convex functions, and the greater value of m indicates higher similarity between the difference of convex functions $L_{DC}(\gamma_t; m)$ and the indicator function $\mathbb{1}(\gamma_t \leq 0)$; the decision vector of the model is denoted as $\theta = [\gamma^T \omega_\ell^T \omega_u^T]^T$, where $\gamma = [\gamma_1 \gamma_2 \cdots \gamma_{|t|}]^T$;

(5) adopting the difference of convex functions optimization based bisection search algorithm to train the extreme learning machine;

using the difference of convex functions optimization based bisection search algorithm to search for the shortest overall width v* of prediction intervals that satisfy the chance constraint, so as to realize the training of the extreme learning machine; and specifically comprising the following steps:

step (1), giving a bisection search algorithm precision $\epsilon_1$ and a bisection search interval $[\underline{v}_\ell, \underline{v}_u]$, wherein the given bisection search interval should contain the shortest overall width v* of the prediction intervals;

Step (2): for the parametric difference convex functions optimization, setting the parameter v thereof as a midpoint $(\underline{v}_\ell + \underline{v}_u)/2$ of the bisection search interval, and solving the difference of convex functions optimization model by using a convex-concave procedure algorithm:

step (2.1): giving an algorithm convergence accuracy $\epsilon_2$, the slope parameter m of the difference of convex functions, and the parameter v representing the overall width budget of the prediction intervals;

step (2.2): setting an iteration counter k←0; solving the following linear programming problem to obtain an initial solution $\theta^{(0)}$ of the model:

$$\theta^{(0)} \leftarrow \operatorname{argmin}_{\gamma_t, \omega_\ell, \omega_u} 1^T \gamma$$

which is subject to:

$$\gamma_t \geq 0, \forall t \in \mathcal{T}$$

$$\gamma_t \geq f(x_t, \omega_\ell) - y_t, \forall t \in \mathcal{T}$$

$$\gamma_t \geq y_t - f(x_t, \omega_u), \forall t \in \mathcal{T}$$

$$\sum_{k \in \mathcal{T}}[f(x_t, \omega_u) - f(x_t, \omega_\ell)] \leq v$$

$$0 \leq f(x_t, \omega_\ell) \leq f(x_t, \omega_u) \leq 1, \forall t \in \mathcal{T}$$

where 1 is a vector with all elements being 1, whose dimension is the same as the number of the samples in the training set;

step (2.3): updating the solution of the parametric difference of convex functions optimization model in a $(k+1)^{th}$ iteration by using the following formula:

$$\theta^{(k+1)} \leftarrow \operatorname{argmin}_{\gamma_t, \omega_\ell, \omega_u} L_{vex}^+(\gamma) - \left[L_{vex}^-(\gamma^{(k)}) + \delta^{(k)T}(\gamma - \gamma^{(k)})\right]$$

which subject to:

$$L_{vex}^+(\gamma) = \sum_{k \in \mathcal{T}} [1 + \max\{-m\gamma_t - 1, 0\}]$$

$$L_{vex}^-(\gamma) = \sum_{k \in \mathcal{T}} \max\{-m\gamma_t - 1, 0\}$$

$$\gamma_t \geq f(x_t, \omega_\ell) - y_t, \forall t \in \mathcal{T}$$

$$\gamma_t \geq y_t - f(x_t, \omega_u), \forall t \in \mathcal{T}$$

$$\sum_{k \in \mathcal{T}} [f(x_t, \omega_u) - f(x_t, \omega_\ell)] \leq v$$

$$0 \leq f(x_t, \omega_\ell) \leq f(x_t, \omega_u) \leq 1, \forall t \in \mathcal{T}$$

where $L_{vex}^+(\gamma)$ and $L_{vex}^-(\gamma)$ are both convex functions, which constitute a minuend and a subtrahend of the difference of convex function $L_{DC}(\gamma_t; m)$; $\delta^{(k)}$ is a subdifferential of the convex function $L_{vex}^-(\gamma)$ at $\gamma^{(k)}$, satisfying $$\delta^{(k)} \in \{g \in \mathbb{R}^{|\mathcal{T}|} \mid L_{vex}^-(\gamma) \geq L_{vex}^-(\gamma^{(k)}) + g^T(\gamma - \gamma^{(k)}), \forall \gamma\} =$$

$$\left\{[g_1 \; g_2 \; \cdots \; g_{|\mathcal{T}|}]^T \mid \forall t \in \mathcal{T}, \begin{cases} g_t = -m & \text{if } \gamma_t \leq 0 \\ g_t \in [-m, 0] & \text{if } \gamma_t = 0 \\ g_t = 0 & \text{if } \gamma_t > 0 \end{cases}\right\}$$

where $g \in \mathbb{R}^{|\mathcal{T}|}$ indicates that g is a real column vector with dimensionality equal to the number of samples $|\mathcal{T}|$ in the training set;

step (2.4): the iteration counter self-increasing $k \leftarrow k+1$; calculating a convergence error $e \leftarrow \theta^{(k)} - \theta^{(k-1)}$; and step (2.5), checking whether a Euclidean norm $\|e\|_2$ of the convergence error meets the convergence accuracy $\in_2$, and if not, returning to the step (3), otherwise outputting the converged solution $\bar{\theta} \leftarrow \theta^{(k)}$.

step (3): calculating the number miss of samples of which the wind power in the training set falls outside the prediction interval $$\text{miss} \leftarrow \Sigma_{t \in \mathcal{T}} [1 - \mathbb{1}(f(x_t, \bar{\omega}_\ell) \leq y_t \leq f(x_t, \bar{\omega}_u))]$$

step (4), if miss $\leq \beta |\mathcal{T}|$, updating the upper boundary $\underline{v}_u \leftarrow (\underline{v}_\ell + \underline{v}_u)/2$ of the bisection search interval and recording weight vectors $\omega_\ell \leftarrow \bar{\omega}_\ell$, $\omega_u \leftarrow \bar{\omega}_u$ of the output layer of the current extreme learning machine; otherwise, updating the lower boundary $\underline{v}_\ell \leftarrow (\underline{v}_\ell + \underline{v}_u)/2$ of the bisection search interval;

step (5): if $\underline{v}_u - \underline{v}_\ell \leq \in_1$, outputting the weight vectors $\omega_\ell$ and $\omega_u$ of the output layer of the extreme learning machine, otherwise, returning to step (2).

The method has the following beneficial effects:

Aiming at the problem of nonparametric interval forecasts of wind power, a chance constrained extreme learning machine model is proposed. The model uses chance constraint to ensure that the confidence level of the prediction intervals meet the reliability requirements, and minimizes the interval width, avoiding the parametric hypothesis of wind power probability distribution and fixed quantile proportions of traditional prediction intervals, thereby realizing the self-adaptive direct construction of wind power prediction intervals; based on the training data, a sample average approximation model of the chance constrained extreme learning machine is established, and the sample average approximation model is transformed into a 0-1 loss minimization model and a parametric difference of convex functions optimization model, and the training of the extreme learning machine is transformed into searching the shortest overall interval width meeting the chance constraint; a bisection search algorithm based on difference of convex functions optimization is proposed to realize efficient training of the chance constrained extreme learning machine. The wind power prediction intervals obtained by the method have shorter interval width on the premise of ensuring a reliable confidence level, and provides more accurate uncertainty quantitative information for power system decision-making. In addition to wind power, the method of the present application is also applicable to interval forecasts of other renewable energy sources and loads, and thus has wide applicability.

DESCRIPTION OF EMBODIMENTS

Figure 1:
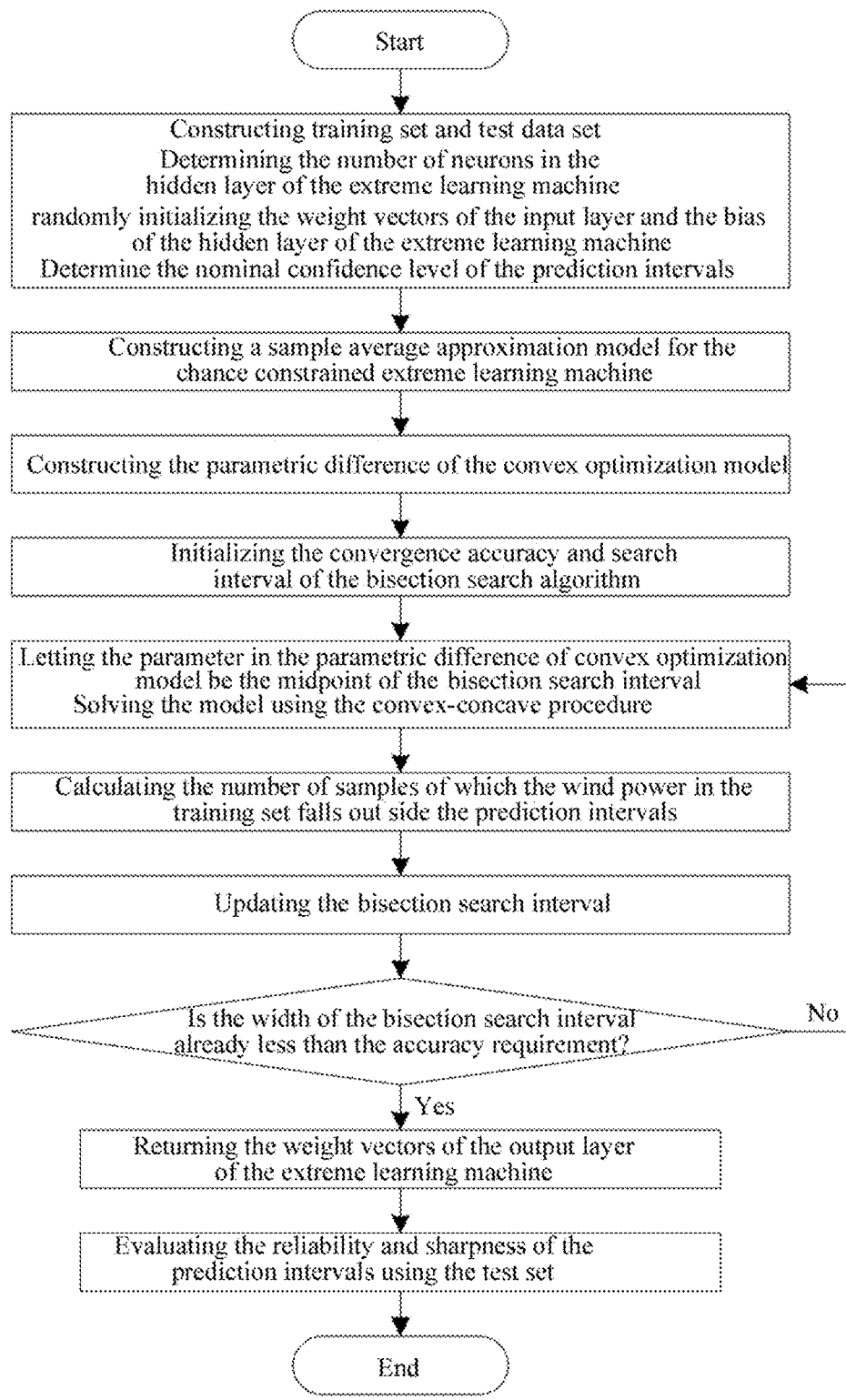
FIG. 1 is a flowchart of the chance constrained extreme learning machine based nonparametric interval forecast of the present application.

The present application will be further explained with reference to the drawings and examples.

(1) a training data set $\mathcal{D} = \{(x_t, y_t)\}_{t \in \mathcal{T}}$ and a test data set $\bar{\mathcal{D}} = \{(x_t, y_t)\}_{t \in V}$ are constructed, wherein $x_t$ is an input feature, $y_t$ is a wind power value to be predicted, and $\mathcal{T}$ and $V$ subscript sets of the samples in the training set and test set respectively; the number of the hidden-layer neurons of the extreme learning machine is determined; the weight vector of the input layer and the bias of the hidden layer of extreme learning machine are randomly initialized; the nominal confidence level of the prediction interval $100(1-\beta)\%$ is determined.

(2) A sample average approximation model of the chance constrained extreme learning machine is constructed $$\min_{\gamma_t, \omega_\ell, \omega_u} \sum_{k \in \mathcal{T}} [f(x_t, \omega_u) - f(x_t, \omega_\ell)]$$

which is subject to:

$$\gamma_t = \max\{f(x_t, \omega_\ell) - y_t, y_t - f(x_t, \omega_u)\}, \forall t \in \mathcal{T}$$

$$\sum_{k \in \mathcal{T}} [1 - \mathbb{1}(\gamma_t \leq 0)] \leq \beta |\mathcal{T}|$$

$$0 \leq f(x_t, \omega_\ell) \leq f(x_t, \omega_u) \leq 1, \forall t \in \mathcal{T}$$

where $f(x, \omega_\ell)$ and $f(x, \omega_u)$ are output equations of the extreme learning machine, which represent upper and lower boundaries of the prediction interval respectively, $\omega_\ell$ and $\omega_u$ are weight vectors from the hidden layer of the extreme learning machine to an output neuron; $\gamma_t$ is the auxiliary variable indicating whether the wind power falls into the prediction interval, a non-negative value indicating that the wind power falls into the corresponding prediction interval, and a positive value indicating that the wind power does not fall into the corresponding prediction interval; max{•} is the maximum function, taking the maximum value of each variable thereof; $\mathbb{I}$ (•) is the indicator function of a logical discriminant, taking 1 when the logical discriminant is true and 0 when the logical discriminant is false.

(3) The following parametric difference of convex functions optimization model is constructed:

$$\overline{p}(v) = \min_{\gamma_t, \omega_\ell, \omega_u} \Sigma_{t \in \mathcal{T}} [1 - L_{DC}(\gamma_t; m)]$$

which is subject to:

$$L_{DC}(\gamma_t; m) = \max\{-m\gamma_t, 0\} - \max\{-m\gamma_t - 1, 0\}, \forall t \in \mathcal{T}$$

$$\gamma_t \geq f(x_t, \omega_\ell) - y_t, \forall t \in \mathcal{T}$$

$$\gamma_t \geq y_t - f(x_t, \omega_u), \forall t \in \mathcal{T}$$

$$\Sigma_{k \in \mathcal{T}} [f(x_t, \omega_u) - f(x_t, \omega_\ell)] \leq v$$

$$0 \leq f(x_t, \omega_\ell) \leq f(x_t, \omega_u) \leq 1, \forall t \in \mathcal{T}$$

where v is the introduced parameter representing the overall width budget of the prediction intervals; $\overline{p}(v)$ is an optimal value function of the difference convex optimization model with respect to the parametric variable v; $L_{DC}(\gamma_t; m)$ is a difference of convex functions that can be decomposed into the difference of two convex functions, and m is the slope parameter of the difference of convex functions; $f(x, \omega_\ell)$ and $f(x, \omega_u)$ are the output equations of the extreme learning machine; the decision vector of the model is denoted as $\theta = [\gamma^\tau \omega_\ell^\tau \omega_u^\tau]^\tau$, where $\gamma = [\gamma_1 \gamma_2 \cdots \gamma_{|\mathcal{T}|}]^\tau$.

(4) For the parameter v in the difference convex optimization model, the bisection search algorithm is used to search for the shortest overall width v* of the prediction intervals that satisfy the chance constraint, so as to realize the training of the extreme learning machine; the algorithm specifically includes the following steps:

step (1), giving a bisection search algorithm precision $\epsilon_1$ and a bisection search interval $[\underline{v}_\ell, \underline{v}_u]$, wherein the given bisection search interval should contain the shortest overall width v* of the prediction intervals;

Step (2): for the parametric difference of convex functions optimization, setting the parameter v thereof as the midpoint $(\underline{v}_\ell + \underline{v}_u)/2$ of the bisection search interval, and solving the difference of convex functions optimization model by using a convex-concave procedure algorithm as described in steps (2.1)-(2.5):

step (2.1): giving the algorithm convergence accuracy $\epsilon_2$, the slope parameter m of the difference of convex functions, and the parameter v representing the overall width budget of the prediction intervals;

step (2.2): setting the iteration counter k←0; solving the following linear programming problem to obtain an initial solution $\theta^{(0)}$ of the model:

$$\theta^{(0)} \leftarrow \text{argmin}_{\gamma_t, \omega_\ell, \omega_u} 1^T \gamma$$

which is subject to:

$$\gamma_t \geq 0, \forall t \in \mathcal{T}$$

$$\gamma_t \geq f(x_t, \omega_\ell) - y_t, \forall t \in \mathcal{T}$$

$$\gamma_t \geq y_t - f(x_t, \omega_u), \forall t \in \mathcal{T}$$

$$\Sigma_{k \in \mathcal{T}} [f(x_t, \omega_u) - f(x_t, \omega_\ell)] \leq v$$

$$0 \leq f(x_t, \omega_\ell) \leq f(x_t, \omega_u) \leq 1, \forall t \in \mathcal{T}$$

where 1 is a vector with all elements being 1, whose dimension is the same as the number of the samples in the training set;

step (2.3): updating the solution of the parametric difference of convex functions optimization model in the (k+1)$^{th}$ iteration by the following formula:

$$\theta^{(k+1)} \leftarrow \text{argmin}_{\gamma_t, \omega_\ell, \omega_u} L_{vex}^+(\gamma) - \left[L_{vex}^-(\gamma^{(k)}) + \delta^{(k)T}(\gamma - \gamma^{(k)})\right]$$

which is subject to:

$$L_{vex}^+(\gamma) = \Sigma_{k \in \mathcal{T}} [1 + \max\{-m\gamma_t - 1, 0\}]$$

$$L_{vex}^-(\gamma) = \Sigma_{k \in \mathcal{T}} \max\{-m\gamma_t - 1, 0\}$$

$$\gamma_t \geq f(x_t, \omega_\ell) - y_t, \forall t \in \mathcal{T}$$

$$\gamma_t \geq y_t - f(x_t, \omega_u), \forall t \in \mathcal{T}$$

$$\Sigma_{k \in \mathcal{T}} [f(x_t, \omega_u) - f(x_t, \omega_\ell)] \leq v$$

$$0 \leq f(x_t, \omega_\ell) \leq f(x_t, \omega_u) \leq 1, \forall t \in \mathcal{T}$$

where $L_{vex}^+(\gamma)$ and $L_{vex}^-(\gamma)$ are both convex functions, which constitute a minuend and a subtrahend of the difference of convex functions $L_{DC}(\gamma_t; m)$ respectively; $\delta^{(k)}$ is a subdifferential of the convex function $L_{vex}^-(\gamma)$ at $\gamma^{(k)}$, satisfying $$\delta^{(k)} \in \{g \in \mathbb{R}^{|\mathcal{T}|} \mid L_{vex}^-(\gamma) \geq L_{vex}^-(\gamma^{(k)}) + g^T(\gamma - \gamma^{(k)}), \forall \gamma\} = \left\{ [g_1 \, g_2 \cdots g_{|\mathcal{T}|}]^T \mid \forall t \in \mathcal{T}, \begin{cases} g_t = -m & \text{if } \gamma_t \leq 0 \\ g_t \in [-m, 0] & \text{if } \gamma_t = 0 \\ g_t = 0 & \text{if } \gamma_t > 0 \end{cases} \right\}$$

where $g \in \mathbb{R}^{|\mathcal{T}|}$ is a real column vector with dimensionality equal to the number of samples $|\mathcal{T}|$ in the training set;

step (2.4): the iteration counter self-increasing k←k+1; calculating a convergence error e←$\theta^{(k)} - \theta^{(k-1)}$; and step (2.5), checking whether a Euclidean norm $\|e\|_2$ of the convergence error meets the convergence accuracy $\epsilon_2$, and if not, returning to the step (3), otherwise outputting the converged solution $\overline{\theta} \leftarrow \theta^{(k)}$.

step (3): calculating the number miss of samples of which the wind power in the training set falls outside the prediction interval $$\text{miss} \leftarrow \Sigma_{t \in \mathcal{T}} [1 - \mathbb{I}(f(x_t, \overline{\omega}_\ell) \leq y_t \leq f(x_t, \overline{\omega}_u))]$$

step (4), if miss≤β|$\mathcal{T}$|, updating the upper boundary $\underline{v}_u \leftarrow (\underline{v}_\ell + \underline{v}_u)/2$ of the bisection search interval and recording weight vectors $\omega_\ell \leftarrow \overline{\omega}_\ell$, $\omega_u \leftarrow \overline{\omega}_u$ of an output layer of the current extreme learning machine; otherwise, updating the lower boundary $\underline{v}_\ell \leftarrow (\underline{v}_\ell + \underline{v}_u)/2$ of the bisection search interval;

step (5): if $\underline{v}_u - \underline{v}_\ell \leq \in_1$, outputting the weight vectors $\omega_\ell$ and $\omega_u$ of the output layer of the extreme learning machine, otherwise, returning to step (2).

(5) The trained extreme learning machine is used to construct the prediction intervals $\{[f(x_t, \omega_\ell), f(x_t, \omega_u)]\}_{t \in \nu}$ of the test set $\mathcal{D} = \{(x_t, y_t)\}_{t \in \nu}$, and the average coverage deviation (ACD) is used to evaluate the reliability of the prediction intervals, which is defined as the deviation between the empirical coverage probability (ECP) and the nominal confidence level 100(1−β)%:

$$ACD := ECP - (1 - \beta) = \frac{1}{|\mathcal{V}|} \Sigma_{t \in \mathcal{V}} \mathbb{I}(f(x_t, \omega_\ell) \leq y_t \leq f(x_t, \omega_u)) - (1 - \beta)$$

where, |V| is the number of the samples in the test set, the smaller the absolute value of the average coverage deviation, the better the reliability of the prediction interval;

The average width (AW) of the interval is used to evaluate the sharpness of the prediction interval, which is defined as $$AW := \frac{1}{|\mathcal{V}|} \Sigma_{t \in \mathcal{N}} (f(x_t, \omega_u) - f(x_t, \omega_\ell))$$

On the premise of well reliability of the prediction intervals, the smaller the average width of the prediction intervals, the higher the sharpness performance of the prediction intervals.

The above process is shown in FIG. 1.

The effectiveness of the proposed method is verified by the actual wind power data from the Glens of Foudland Wind Farm in Scotland in 2017, and the time resolution of the data is 30 minutes. Considering the differences of seasonal characteristics, the wind power prediction model for each season is independently trained and verified, in which the training samples account for 60% of the data set in each season, and the remaining 40% samples are used as the test set. The leading time for prediction is 1 hour, and the nominal confidence of the prediction intervals is 95%.

Table 1 shows the performance indices of the prediction interval obtained by using sparse Bayesian learning, Gaussian kernel density estimation and the method of the present application. It can be seen that the absolute value of the average coverage deviation of the present application is less than 1.4%, and the empirical coverage probability is close to the nominal confidence level of 95%, which has excellent reliability; the average coverage deviation of sparse Bayesian learning in winter, summer and autumn data sets exceeds −2.6%, which is difficult to ensure the reliability of prediction; although Gaussian kernel density estimation has well reliability in data sets except winter, the prediction intervals obtained in winter, spring, summer and autumn are respectively 16.5%, 28.4%, 34.3% and 16.3% wider than those obtained by the method of the present application. To sum up, the method of the present application can effectively shorten the interval width on the premise of satisfactory reliability of the prediction interval.

TABLE 1

Performance comparison of prediction intervals obtained by different forecasting methods

| Season | Method | Empirical coverage probability | Average coverage deviation | Average width of interval |
| --- | --- | --- | --- | --- |
| Winter | Sparse Bayesian learning | 90.92% | −4.08% | 0.2971 |
| | Gaussian kernel density estimation | 92.05% | −2.95% | 0.3808 |
| | The method of the present application | 93.66% | −1.34% | 0.3268 |
| Spring | Sparse Bayesian learning | 93.58% | −1.42% | 0.2714 |
| | Gaussian kernel density estimation | 93.39% | −1.61% | 0.3110 |
| | The method of the present application | 94.06% | −0.94% | 0.2423 |
| Summer | Sparse Bayesian learning | 91.53% | −3.47% | 0.2128 |
| | Gaussian kernel density estimation | 95.76% | 0.76% | 0.2621 |
| | The method of the present application | 94.42% | −0.58% | 0.1952 |
| Autumn | Sparse Bayesian learning | 92.38% | −2.62% | 0.3572 |
| | Gaussian kernel density estimation | 96.37% | 1.37% | 0.4294 |
| | The method of the present application | 95.01% | 0.01% | 0.3693 |

Figure 2:
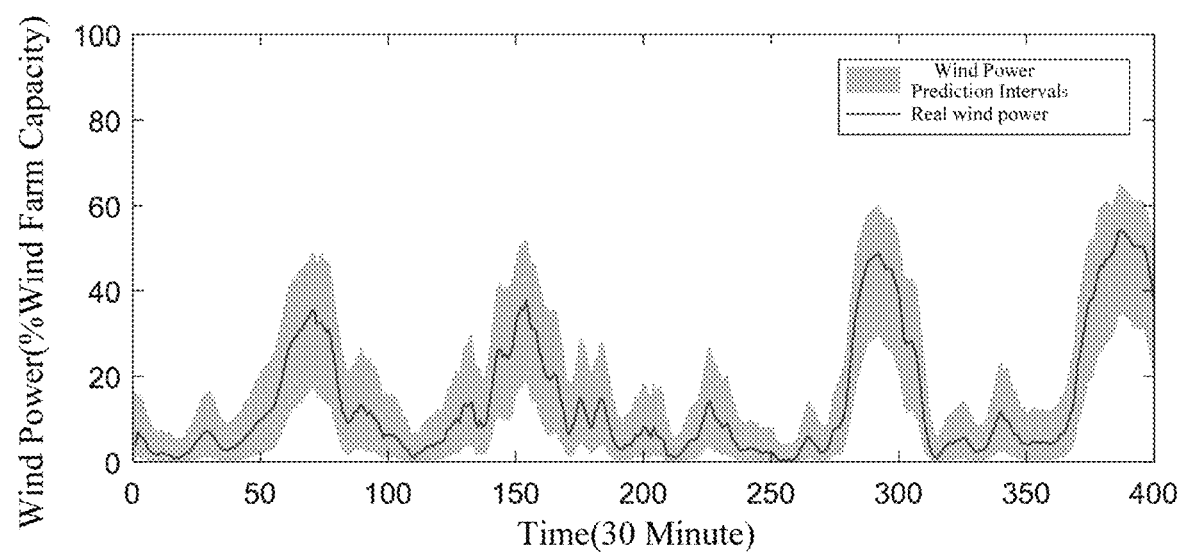
FIG. 2 displays the wind power prediction intervals of a summer data set obtained by the method of the present application.

FIG. 2 shows the prediction intervals obtained by the method in summer data set and the corresponding real wind power. It can be seen that the prediction intervals obtained by the proposed method can well track the ramp events of wind power, and the width of the prediction intervals can be adaptively adjusted according to the input features, and thus the method has excellent performance. It should be noted that this method is also applicable to interval prediction of power generation and load of other renewable energy sources except wind power, and thus has wide applicability.

The above description of the specific embodiments of the present application is not intended to limit the scope of protection of the present application. All equivalent models or equivalent algorithm flowcharts made according to the content of the description and drawings of the present application, which are directly or indirectly applied to other related technical fields, all fall within the scope of patent protection of the present application.

What is claimed is:

1. A chance constrained extreme learning machine method for nonparametric interval forecasting of wind power, comprising the following steps of:
   1) constructing a model of a chance constrained extreme learning machine;
   2) constructing a sample average approximation model of the chance constrained extreme learning machine;
   3) constructing a parametric 0-1 loss minimization model;
   4) constructing a parametric difference of convex functions optimization model;
   5) adopting a bisection search algorithm based on difference of convex functions optimization to train the chance constrained extreme learning machine;
   wherein the step 1) comprises: comprehensively considering a joint probability distribution of a wind power and an input feature thereof, limiting the wind power to fall into prediction intervals with a probability not lower than a nominal confidence level by using chance constraint, and taking an expectation of minimizing an interval width as a training objective, and constructing the chance constrained extreme learning machine model:

$$\min_{\omega_\ell, \omega_u} \mathbb{E}_\mu [f(x, \omega_u) - f(x, \omega_\ell)]$$

which is subject to:

$$\mathbb{P}_\mu[f(x, \omega_\ell) \leq y \leq f(x, \omega_u)] \geq 100(1 - \beta) \%$$

$$0 \leq f(x, \omega_\ell) \leq f(x, \omega_u) \leq 1$$

where x is a random variable corresponding to the input feature, y is a random variable corresponding to normalized wind power, the joint probability distribution of the two is denoted as $\mu(x,y)$; $f(x, \omega_\ell)$ and $f(x, \omega_u)$ are output equations of the chance constrained extreme learning machine, which represent upper and lower boundaries of the prediction intervals, respectively, $\omega_\ell$ and $\omega_u$ are weight vectors from a hidden layer of the extreme learning machine to an output neuron; $100(1-\beta)\%$ is the nominal confidence level of the prediction intervals; $\mathbb{E}$ and $\mathbb{P}$ denote expectation and probability operators, respectively;

the step 2) comprises: replacing the joint probability distribution of the input feature and wind power with an empirical probability distribution of training set samples thereof, approximating an actual expectation in an objective function by empirical expectation, and approximating an actual probability in the chance constraint by empirical probability to obtain the sample average approximate model of the chance constrained extreme learning machine;

$$v^* = \min_{\gamma_t, \omega_\ell, \omega_u} \sum_{t \in \mathcal{T}} [f(x_t, \omega_u) - f(x_t, \omega_\ell)]$$

which is constrained by:

$$\gamma_t = \max\{f(x_t, \omega_\ell) - y_t, y_t - f(x_t, \omega_u)\}, \forall t \in \mathcal{T}$$

$$\sum_{t \in \mathcal{T}} [1 - \mathbb{I}(\gamma_t \leq 0)] \leq \beta|\mathcal{T}|$$

$$0 \leq f(x_t, \omega_\ell) \leq f(x_t, \omega_u) \leq 1, \forall t \in \mathcal{T}$$

where v* is an optimal value of the optimization model, which denotes a shortest overall width of the prediction intervals satisfying the chance constraint; $x_t$ and $y_t$ are an input feature and the wind power; $\mathbb{T}$ is a subscript set of various samples of the training set $\{(x_t, y_t)\} \mathbb{T}$, | $\mathbb{T}$ | is a number of the samples of the training set, $\beta|\mathbb{T}|$ is a maximum number of wind power samples outside the prediction intervals at the nominal confidence level; $Y_t$ is an auxiliary variable indicating whether the wind power falls into the prediction intervals, with a non-negative value indicating that the wind power falls into a corresponding prediction interval of the prediction intervals or a positive value indicating that the wind power does not fall into a corresponding prediction interval of the prediction intervals; max {•} is a maximum function, taking a maximum value of each variable thereof; $\mathbb{I}$ (•) is an indicator function of a logical discriminant, with a value being 1 when the logical discriminant is true and 0 when the logical discriminant is false;

the step 3) comprises: introducing a virtual parametric variable to represent an overall width budget of the prediction intervals, minimizing the probability that the wind power does not fall into the prediction intervals on a premise of meeting the overall width budget of the prediction intervals to obtain the parametric minimized 0-1 loss minimization model;

$$\rho(v) = \min_{\gamma_t, \omega_\ell, \omega_u} \sum_{t \in \mathcal{T}} [1 - \mathbb{I}(\gamma_t \leq 0)]$$

which is subject to:

$$\gamma_t \geq f(x_t, \omega_\ell) - y_t, \forall t \in \mathcal{T}$$

$$\gamma_t \geq y_t - f(x_t, \omega_u), \forall t \in \mathcal{T}$$

$$\sum_{t \in \mathcal{T}} [f(x_t, \omega_u) - f(x_t, \omega_\ell)] \leq v$$

$$0 \leq f(x_t, \omega_\ell) \leq f(x_t, \omega_u) \leq 1, \forall t \in \mathcal{T}$$

where v is the introduced virtual parametric variable representing the overall width budget of the prediction intervals; ρ(v) is an optimal value function of the minimized 0-1 loss model with respect to the parametric variable v, and a smallest parametric variable that satisfies the condition $\rho(v) \leq \beta |\mathbb{I}|$ is a shortest overall width v* of the prediction intervals that satisfies the chance constraint;

the step 4) comprises: approximating the indicator function of the logical discriminant in the objective function of the minimized 0-1 loss model with the parametric variable v by a difference of convex functions to obtain the difference of convex functions optimization model with the parametric variable v:

$$\overline{\rho}(v) = \min_{\gamma_t, \omega_\ell, \omega_u} \sum_{t \in \mathcal{T}} [1 - L_{DC}(\gamma_t; m)]$$

which is constrained by:

$$L_{DC}(\gamma_t; m) = \max\{-m\gamma_t, 0\} - \max\{-m\gamma_t - 1, 0\}, \forall t \in \mathcal{T}$$

$$\gamma_t \geq f(x_t, \omega_\ell) - y_t, \forall t \in \mathcal{T}$$

$$\gamma_t \geq y_t - f(x_t, \omega_u), \forall t \in \mathcal{T}$$

$$\sum_{t \in \mathcal{T}} [f(x_t, \omega_u) - f(x_t, \omega_\ell)] \leq v$$

$$0 \leq f(x_t, \omega_\ell) \leq f(x_t, \omega_u) \leq 1, \forall t \in \mathcal{T}$$

where $\overline{\rho}(v)$ is an optimal value function of the difference of convex functions optimization model with the parameter v; $L_{DC}(\gamma_t; m)$ is a difference of convex functions approximating the indicator function $\mathbb{I}(\gamma_t \leq 0)$; m is a positive slope parameter of the difference of convex functions, m is a positive value, and the greater the value of m, the higher the similarity between the difference of convex functions $L_{DC}(\gamma_t; m)$ and the indicator function $\mathbb{I}(\gamma_t \leq 0)$; the decision vector of the model is denoted as $\theta = [\mathbb{I}]^\tau$, where $\gamma = [\gamma_1 \gamma_2 \cdots \mathbb{I}]^\tau$;

the step 5) comprises: using the bisection search algorithm based on difference of convex functions optimization to search for the shortest overall width v* of the prediction intervals that satisfy the chance constraint, so as to realize the training of the extreme learning machine; and further comprising the following steps:

step (1), giving a bisection search algorithm precision $\in_1$ and a bisection search interval $[v_l, v_u]$, wherein the given bisection search interval should contain the shortest overall width v* of the prediction intervals;

Step (2): for the parametric difference of convex functions optimization model, setting the parameter v thereof as a midpoint $(v_l + v_u)/2$ of the bisection search interval, and solving the difference of convex functions optimization model by using a convex-concave procedure algorithm, with a solution being $\overline{\theta} = [\mathbb{I}]^\tau$;

step (3): calculating the number miss of samples of which the wind power in the training set falls outside the prediction intervals:

$$\text{miss} \leftarrow \sum_{t \in \mathcal{T}} [1 - \mathbb{I}(f(x_t, \overline{\omega}_\ell) \leq y_t \leq f(x_t, \overline{\omega}_u))]$$

step (4), if miss $\leq \gamma |\mathbb{I}|$, updating the upper boundary $v_u \leftarrow (v_l + v_u)/2$ of the bisection search interval and recording weight vectors $\omega_l \leftarrow \overline{\omega}_l$, $\omega_u \leftarrow \overline{\omega}_u$ of an output layer of the current extreme learning machine; otherwise, updating the lower boundary $v_l \leftarrow (v_l + v_u)/2$ of the bisection search interval;

step (5): if $v_u - v_l \leq \epsilon_1$, outputting the weight vectors $\omega_l$ and $\omega_u$ of the output layer of the extreme learning machine, otherwise, returning to step (2); and 6) constructing the prediction intervals $\{[f(x_t, \omega_l), f(x_t, \omega_u)]\} \mathbb{I}$ of a test set $\mathbb{I} = \{(x_t, y_t)\} \mathbb{I}$ based on the trained chance constrained extreme learning machine, evaluating the reliability of the prediction intervals using average coverage deviation (ACD), evaluating the sharpness of the prediction intervals using average width (AW), outputting the wind power with the minimized interval width, and providing more accurate uncertainty quantification information for decision makers of a power system.

2. The chance constrained extreme learning machine method for nonparametric interval forecasting of wind power according to claim 1, wherein a convex-concave procedure algorithm is adopted to solve the difference of convex functions optimization model with a given parameter, which comprises the following steps:

step (1): giving an algorithm convergence accuracy $\in_2$, the slope parameter m of the difference of convex functions, and the parameter v representing the overall width budget of the prediction intervals;

step (2): setting an iteration counter $k \leftarrow 0$; solving the following linear programming problem to obtain an initial solution $\theta^{(0)}$ of the difference of convex functions optimization model:

$$\theta^{(0)} \leftarrow \arg \min_{\gamma_t, \omega_\ell, \omega_u} 1^T \gamma$$

which is subject to:

$$\gamma_t \geq f(x_t, \omega_\ell) - y_t, \forall t \in \mathcal{T}$$

$$\gamma_t \geq y_t - f(x_t, \omega_u), \forall t \in \mathcal{T}$$

$$\sum_{t \in \mathcal{T}} [f(x_t, \omega_u) - f(x_t, \omega_\ell)] \leq v$$

$$0 \leq f(x_t, \omega_\ell) \leq f(x_t, \omega_u) \leq 1, \forall t \in \mathcal{T}$$

where 1 is a vector with all elements being 1, whose dimension is the same as the number of the samples in the training set;

step (3): updating the solution of the parametric difference of convex functions optimization model in a $(k+1)^{th}$ iteration by using the following formula:

$$\theta^{(k+1)} \leftarrow \arg \min_{\gamma_t, \omega_\ell, \omega_u} L^+_{vex}(\gamma) - \left[L^-_{vex}(\gamma^{(k)}) + \delta^{(k)^T}(\gamma - \gamma^{(k)})\right]$$

which is subject to:

$$L^+_{vex}(\gamma) = \sum_{t \in \mathcal{T}} [1 + \max\{-m\gamma_t - 1, 0\}]$$

$$L^-_{vex}(\gamma) = \sum_{t \in \mathcal{T}} \max\{-m\gamma_t - 1, 0\}$$

-continued $$\gamma_t \geq f(x_t, \omega_\ell) - y_t, \forall\, t \in \mathcal{T}$$

$$\gamma_t \geq y_t - f(x_t, \omega_u), \forall\, t \in \mathcal{T}$$

$$\sum_{t \in \mathcal{T}} [f(x_t, \omega_u) - f(x_t, \omega_\ell)] \leq v$$

$$0 \leq f(x_t, \omega_\ell) \leq f(x_t, \omega_u) \leq 1, \forall\, t \in \mathcal{T}$$

where $L_{vex}^+(\gamma)$ and $L_{vex}^-(\gamma)$ are both convex functions, which constitute a minuend and a subtrahend of the difference of convex functions $L_{DC}(\gamma_t; m)$, respectively; $\delta^{(k)}$ is a subdifferential of the convex function $L_{vex}^-(\gamma)$ at $\gamma^{(k)}$, satisfying $$\delta^{(k)} \in \{g \in \mathbb{R}^{|\mathcal{T}|} \mid L_{vex}^-(\gamma) \geq L_{vex}^-(\gamma^{(k)}) + g^T(\gamma - \gamma^{(k)}), \forall\, \gamma\} =$$

$$\left\{ [g_1\ g_2\ \cdots\ g_{|\mathcal{T}|}]^T \mid \forall\, t \in \mathcal{T}, \begin{cases} g_t = -m & \text{if } \gamma_t \leq 0 \\ g_t \in [-m, 0] & \text{if } \gamma_t = 0 \\ g_t = 0 & \text{if } \gamma_t > 0 \end{cases} \right\}$$

where $g \in \mathbb{R}^{|\mathcal{T}|}$ is a real column vector with a dimensionality equal to the number of samples $|\mathcal{T}|$ in the training set;

step (4): the iteration counter self-increasing $k \leftarrow k+1$; calculating a convergence error $e \leftarrow \theta^{(k)} - \theta^{(k-1)}$; and step (5), checking whether a Euclidean norm $\|e\|_2$ of the convergence error meets the convergence accuracy $\in_2$, and if not, returning to the step (3), otherwise outputting a converged solution $\overline{\omega} \leftarrow \theta^{(k)}$.

\* \* \* \* \*